United States Patent
Onishi et al.

(10) Patent No.: US 10,375,618 B2
(45) Date of Patent: Aug. 6, 2019

(54) WIRELESS COMMUNICATION APPARATUS AND WIRELESS COMMUNICATION METHOD

(71) Applicant: TOYOTA JIDOSHA KABUSHIKI KAISHA, Toyota-shi, Aichi-ken (JP)

(72) Inventors: Ryokichi Onishi, Tokyo (JP); Masaaki Sasahara, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/470,160

(22) Filed: Mar. 27, 2017

(65) Prior Publication Data
US 2017/0289896 A1    Oct. 5, 2017

(30) Foreign Application Priority Data

Mar. 30, 2016    (JP) .................................. 2016-069310

(51) Int. Cl.
*G08G 1/01*     (2006.01)
*H04W 4/38*     (2018.01)
(Continued)

(52) U.S. Cl.
CPC .......... *H04W 40/20* (2013.01); *H04B 1/3822* (2013.01); *H04L 45/023* (2013.01);
(Continued)

(58) Field of Classification Search
CPC ......... H04L 45/02; H04L 45/20; H04L 67/12; H04W 40/026; H04W 40/20;
(Continued)

(56) References Cited

U.S. PATENT DOCUMENTS 5,717,700 A * 2/1998 Crouch .......... G01R 31/318536
714/726
6,816,456 B1 * 11/2004 Tse-Au ............... H04L 41/5054
370/230.1
(Continued)

FOREIGN PATENT DOCUMENTS

CN     105684508 A  *  6/2016  ............. H04L 67/12
DE     102009039734 A1     5/2010
(Continued)

OTHER PUBLICATIONS

Zhao et al., VADD: Vehicle-Assisted Data Delivery in Vehicular Ad Hoc Networks, May 16, 2008, IEEE Transactions on Vehicular Technology, vol. 57, Issue 3, pp. 1910-1922 (Year: 2008).*
(Continued)

*Primary Examiner* — Eric Nowlin
(74) *Attorney, Agent, or Firm* — Oliff PLC

(57) ABSTRACT

An apparatus which transfers information addressed to a master node, comprises a generation unit configured to generate an assessment value representing logical proximity to the master node; a transmit unit that sends/receives the assessment value to/from other apparatuses; and a communication unit that, when this apparatus is an apparatus that is logically closest to the master node within a communication range, receive information addressed to the master node from other apparatuses, otherwise, transmit information addressed to the master node to the logically closest apparatus, wherein the communication unit is configured to generate a delay time based on the assessment value when transferring the information received from the other apparatuses to yet another apparatus.

10 Claims, 10 Drawing Sheets

US 10,375,618 B2
Page 2

(51) Int. Cl.
| | |
|---|---|
| *H04W 4/80* | (2018.01) |
| *H04L 29/08* | (2006.01) |
| *H04W 40/02* | (2009.01) |
| *H04W 40/20* | (2009.01) |
| *H04W 40/22* | (2009.01) |
| *H04W 76/14* | (2018.01) |
| *H04W 84/00* | (2009.01) |
| *H04W 84/12* | (2009.01) |
| *H04W 84/18* | (2009.01) |
| *H04W 88/04* | (2009.01) |
| *H04B 1/3822* | (2015.01) |
| *H04L 12/757* | (2013.01) |

(52) U.S. Cl.
CPC ............. *H04L 67/12* (2013.01); *H04W 4/80* (2018.02); *H04W 40/02* (2013.01); *H04W 40/22* (2013.01); *H04W 76/14* (2018.02); *H04W 84/18* (2013.01); *H04W 88/04* (2013.01); *G08G 1/0141* (2013.01); *H04W 4/38* (2018.02); *H04W 84/005* (2013.01); *H04W 84/12* (2013.01)

(58) Field of Classification Search
CPC ... H04W 40/22; H04W 84/005; H04W 84/18; H04W 4/02; H04W 4/023; H04W 4/027; H04W 4/046; H04W 4/40; H04W 4/44; H04W 4/70; H04W 4/80
See application file for complete search history.

(56) References Cited

U.S. PATENT DOCUMENTS

| | | | | |
|---|---|---|---|---|
| 7,574,216 | B2 * | 8/2009 | Leitch | H04W 56/0015 455/456.1 |
| 7,853,844 | B2 * | 12/2010 | Sasagawa | G01R 31/31708 714/25 |
| 7,885,285 | B2 * | 2/2011 | Fukuyama | H04L 45/121 370/230 |
| 7,903,653 | B2 * | 3/2011 | Lee | H04L 12/189 370/390 |
| 7,911,981 | B2 * | 3/2011 | Park | H04L 12/1886 370/254 |
| 8,351,417 | B2 * | 1/2013 | Chen | H04L 45/00 370/217 |
| 8,359,002 | B2 * | 1/2013 | Morris | H04B 17/318 370/311 |
| 8,385,231 | B2 * | 2/2013 | Rojas-Cessa | H04L 45/02 370/256 |
| 8,406,248 | B2 * | 3/2013 | Pratt, Jr. | G01D 21/00 370/444 |
| 8,493,841 | B2 * | 7/2013 | Nozaki | H04L 45/04 370/221 |
| 8,493,981 | B2 * | 7/2013 | Yousefi | H04N 7/183 370/395.42 |
| 8,578,054 | B2 * | 11/2013 | Thubert | H04L 45/128 370/225 |
| 8,582,579 | B2 * | 11/2013 | Yousefi | H04N 7/183 370/395.42 |
| 8,605,721 | B1 * | 12/2013 | Chan | H04L 65/4076 370/390 |
| 8,654,649 | B2 * | 2/2014 | Vasseur | H04W 40/22 370/238 |
| 8,675,629 | B2 * | 3/2014 | Yi | H04W 56/0045 370/347 |
| 8,718,055 | B2 * | 5/2014 | Vasseur | H04W 40/248 370/252 |
| 8,937,886 | B2 * | 1/2015 | Shaffer | H04L 45/023 370/255 |
| 9,014,190 | B2 * | 4/2015 | Nguyen | H04W 40/12 370/392 |
| 9,014,954 | B2 * | 4/2015 | Sato | G08G 1/0112 701/118 |
| 9,124,482 | B2 * | 9/2015 | Vasseur | H04L 45/121 |
| 9,237,505 | B2 * | 1/2016 | Munari | H04W 4/70 |
| 9,247,512 | B2 * | 1/2016 | Schultz | H04W 56/0015 |
| 9,276,801 | B2 * | 3/2016 | Yousefi | H04N 7/183 |
| 9,361,802 | B2 * | 6/2016 | Milne | G08G 1/133 |
| 9,449,515 | B2 * | 9/2016 | Rubin | G08G 9/02 |
| 9,510,347 | B2 * | 11/2016 | Thubert | H04W 40/22 |
| 9,531,635 | B2 * | 12/2016 | Vasseur | H04L 45/121 |
| 9,608,912 | B2 * | 3/2017 | Thubert | H04L 47/125 |
| 9,626,420 | B2 * | 4/2017 | Barton | H04L 67/1095 |
| 9,634,782 | B2 * | 4/2017 | Suzuki | H04J 3/0667 |
| 9,723,457 | B2 * | 8/2017 | Brahmi | H04L 67/12 |
| 9,755,980 | B2 * | 9/2017 | Chen | H04Q 11/0066 |
| 9,817,584 | B2 * | 11/2017 | Chen | G06F 3/0611 |
| 9,832,706 | B2 * | 11/2017 | Miranda d'Orey | H04W 40/22 |
| 9,883,507 | B2 * | 1/2018 | Thubert | H04W 40/22 |
| 9,935,764 | B2 * | 4/2018 | Schulz | H04W 56/0015 |
| 9,936,367 | B2 * | 4/2018 | Schwartz | H04W 76/11 |
| 10,102,268 | B1 * | 10/2018 | Sivathanu | G06F 16/282 |
| 10,142,088 | B2 * | 11/2018 | Liu | H04J 3/0664 |
| 2007/0008150 | A1 | 1/2007 | Hassell | |
| 2007/0030857 | A1 | 2/2007 | Fulknier et al. | |
| 2007/0115868 | A1 | 5/2007 | Chen et al. | |
| 2007/0184864 | A1 * | 8/2007 | Leitch | H04W 56/0015 455/507 |
| 2007/0255992 | A1 * | 11/2007 | Sasagawa | G01R 31/31708 714/736 |
| 2007/0286097 | A1 * | 12/2007 | Davies | H04L 45/02 370/255 |
| 2008/0095163 | A1 * | 4/2008 | Chen | H04L 45/16 370/392 |
| 2009/0010205 | A1 * | 1/2009 | Pratt, Jr. | G01D 21/00 370/328 |
| 2009/0034433 | A1 * | 2/2009 | Chegaray | H04W 84/18 370/255 |
| 2009/0080344 | A1 * | 3/2009 | Park | H04L 12/1886 370/254 |
| 2009/0216910 | A1 * | 8/2009 | Duchesneau | G06F 9/5072 709/250 |
| 2009/0228575 | A1 * | 9/2009 | Thubert | H04L 45/128 709/220 |
| 2009/0285197 | A1 * | 11/2009 | Chen | H04L 45/00 370/351 |
| 2010/0060480 | A1 | 3/2010 | Bai et al. | |
| 2010/0080168 | A1 * | 4/2010 | Fukuyama | H04L 45/121 370/328 |
| 2010/0097971 | A1 * | 4/2010 | Kang | H04L 12/185 370/312 |
| 2010/0149983 | A1 * | 6/2010 | Lee | H04L 12/189 370/235 |
| 2010/0158021 | A1 * | 6/2010 | Kliger | H04L 12/2801 370/400 |
| 2010/0214934 | A1 * | 8/2010 | Conan | H04L 45/00 370/252 |
| 2010/0250346 | A1 * | 9/2010 | Bai | G06Q 30/00 705/14.1 |
| 2011/0026437 | A1 * | 2/2011 | Roja-Cessa | H04L 45/02 370/256 |
| 2011/0134762 | A1 * | 6/2011 | Chen | H04L 43/0864 370/252 |
| 2011/0235504 | A1 * | 9/2011 | Nozaki | H04L 45/04 370/221 |
| 2012/0106447 | A1 * | 5/2012 | Yousefi | H04N 7/183 370/328 |
| 2012/0106526 | A1 * | 5/2012 | Yousefi | H04N 7/183 370/338 |
| 2012/0108163 | A1 | 5/2012 | Bai et al. | |
| 2012/0155329 | A1 * | 6/2012 | Shaffer | H04L 45/023 370/255 |
| 2012/0327918 | A1 * | 12/2012 | Yi | H04W 56/0045 370/337 |
| 2013/0022042 | A1 * | 1/2013 | Vasseur | H04L 45/121 370/389 |
| 2013/0028143 | A1 * | 1/2013 | Vasseur | H04W 40/22 370/256 |

(56) References Cited

U.S. PATENT DOCUMENTS

| | | | |
|---|---|---|---|
| 2013/0051286 A1* | 2/2013 | Schultz | H04W 56/0015 370/278 |
| 2013/0099941 A1* | 4/2013 | Jana | H04W 4/023 340/905 |
| 2013/0142059 A1 | 6/2013 | Di Girolamo et al. | |
| 2013/0144516 A1* | 6/2013 | Sato | G08G 1/0112 701/118 |
| 2013/0188513 A1* | 7/2013 | Vasseur | H04W 40/248 370/254 |
| 2013/0198388 A1* | 8/2013 | Dahn | H04L 63/1416 709/226 |
| 2013/0279500 A1* | 10/2013 | Yousefi | H04N 7/183 370/355 |
| 2013/0282263 A1* | 10/2013 | Tee | H04W 40/28 701/118 |
| 2014/0068105 A1* | 3/2014 | Thubert | H04L 45/128 709/239 |
| 2014/0236953 A1* | 8/2014 | Rapaport | G06Q 10/10 707/740 |
| 2014/0328240 A1* | 11/2014 | Munari | H04W 4/70 370/311 |
| 2015/0046374 A1* | 2/2015 | Jacobs | G06Q 30/0283 705/400 |
| 2015/0081201 A1* | 3/2015 | Rubin | G08G 9/02 701/301 |
| 2015/0124844 A1* | 5/2015 | Suzuki | H04J 3/0667 370/519 |
| 2015/0227606 A1* | 8/2015 | Barton | H04L 67/1095 707/622 |
| 2015/0237040 A1* | 8/2015 | Levin | H04L 63/0823 726/7 |
| 2015/0296019 A1* | 10/2015 | Onishi | H04W 12/06 709/228 |
| 2015/0312945 A1 | 10/2015 | Park et al. | |
| 2015/0327261 A1* | 11/2015 | Thubert | H04W 40/22 370/336 |
| 2015/0334031 A1* | 11/2015 | Vasseur | H04L 45/121 370/230 |
| 2016/0019788 A1* | 1/2016 | Milne | G08G 1/133 340/988 |
| 2016/0112187 A1* | 4/2016 | Schulz | H04W 56/0015 370/510 |
| 2016/0135242 A1 | 5/2016 | Hampel et al. | |
| 2016/0173389 A1* | 6/2016 | Perlman | H04L 47/12 370/235 |
| 2016/0212596 A1* | 7/2016 | Brahmi | H04L 67/12 |
| 2016/0270118 A1* | 9/2016 | He | H04W 74/06 |
| 2016/0330012 A1* | 11/2016 | Liu | H04J 3/0664 |
| 2016/0357451 A1* | 12/2016 | Chen | G06F 3/0611 |
| 2016/0366064 A1* | 12/2016 | Chen | H04Q 11/0066 |
| 2017/0006362 A1* | 1/2017 | Shang | H04B 10/0793 |
| 2017/0048853 A1* | 2/2017 | Thubert | H04W 40/22 |
| 2017/0076331 A1* | 3/2017 | Lei | G06Q 30/0267 |
| 2017/0078189 A1* | 3/2017 | Han | H04L 45/20 |
| 2017/0215123 A1* | 7/2017 | Miranda d'Orey | H04W 40/22 |
| 2017/0245197 A1* | 8/2017 | Onishi | H04W 40/18 |
| 2017/0264493 A1* | 9/2017 | Cencini | H04L 41/044 |
| 2017/0289752 A1* | 10/2017 | Onishi | H04W 4/02 |
| 2017/0289896 A1* | 10/2017 | Onishi | H04W 76/14 |
| 2018/0033303 A1* | 2/2018 | Park | G08G 1/166 |
| 2018/0054773 A1* | 2/2018 | Miranda d'Orey | H04W 40/22 |
| 2018/0063238 A1* | 3/2018 | Zhang | H04L 67/1051 |
| 2018/0076839 A1* | 3/2018 | Baghel | H04W 76/20 |
| 2018/0096602 A1* | 4/2018 | She | H04W 84/00 |
| 2018/0176004 A1* | 6/2018 | Schulz | H04W 56/0015 |
| 2018/0212795 A1* | 7/2018 | Kim | H04L 12/403 |
| 2018/0218638 A1* | 8/2018 | Randono | G09B 19/025 |
| 2018/0302807 A1* | 10/2018 | Chen | H04L 45/22 |
| 2018/0332601 A1* | 11/2018 | Kim | H04W 72/1242 |

FOREIGN PATENT DOCUMENTS

| | | | | |
|---|---|---|---|---|
| DE | 102011116972 A1 | 6/2012 | | |
| EP | 2283585 A1 * | 2/2011 | | H04L 45/00 |
| EP | 2283585 A4 * | 10/2012 | | H04L 45/00 |
| EP | 2557892 A1 | 2/2013 | | |
| EP | 2975592 A1 * | 1/2016 | | G08G 1/133 |
| EP | 3042524 A1 * | 7/2016 | | H04L 67/12 |
| EP | 3226647 A1 * | 10/2017 | | H04W 76/14 |
| JP | 2008-027011 A | 2/2008 | | |
| JP | 2009-217371 A | 9/2009 | | |
| JP | 2010-166150 | 7/2010 | | |
| JP | 2012-503449 A | 2/2012 | | |
| JP | 2013-516912 A | 5/2013 | | |
| JP | 2014-096630 A | 5/2014 | | |
| JP | 2015-046887 A | 3/2015 | | |
| JP | 2017184051 A * | 10/2017 | | H04W 76/14 |
| WO | WO-2008051264 A1 * | 5/2008 | | H04B 7/2606 |
| WO | WO-2009140180 A1 * | 11/2009 | | H04L 45/00 |
| WO | 2010/033919 A2 | 3/2010 | | |
| WO | 2011/085073 A1 | 7/2011 | | |
| WO | WO-2011133016 A2 * | 10/2011 | | H04W 40/28 |
| WO | WO-2011133016 A3 * | 1/2012 | | H04W 40/28 |
| WO | WO-2013118129 A1 * | 8/2013 | | H04B 7/2606 |
| WO | 2014/073148 A1 | 5/2014 | | |
| WO | WO-2015017483 A1 * | 2/2015 | | H04W 40/20 |
| WO | WO-2015032436 A1 * | 3/2015 | | H04L 67/12 |
| WO | WO-2017027355 A1 * | 2/2017 | | H04W 72/02 |
| WO | WO-2017123500 A1 * | 7/2017 | | H04L 47/32 |
| WO | WO-2017134605 A1 * | 8/2017 | | H04W 56/00 |
| WO | WO-2017197393 A1 * | 11/2017 | | |

OTHER PUBLICATIONS

Wu et al., MDDV: A Mobility-Centric Data Dissemination Algorithm for Vehicular Networks, Oct. 1, 2004, VANET '04 Proceedings of the 1st ACM International Workshop on Vehicular Ad Hoc Networks, (Year: 2004).*

Kumar et al., Route lifetime based optimal hop selection in VANETs on highway: an analytical viewpoint, May 19, 2006, Networking'06 Proceedings of the 5th international IFIP-TC6 conference on Networking Technologies, Services, and Protocols; pp. 799-814 (Year: 2006).*

Karp et al., GPSR: greedy perimeter stateless routing for wireless networks, Aug. 11, 2000, MobiCom '00 Proceedings of the 6th annual international conference on Mobile computing and networking, pp. 243-254 (Year: 2000).*

Liu et al., A survey on position-based routing for vehicular ad hoc networks, May 2016, Telecommun. Syst. 62, 1 (May 2016), 15-30. DOI=http://dx.doi.org/10.1007/s11235-015-9979-7, pp. 15-30 (Year: 2016).*

Lochert et al., A routing strategy for vehicular ad hoc networks in city environments, Jun. 11, 2003, IEEE IV2003 Intelligent Vehicles Symposium. Proceedings, DOI=https://doi.org/10.1109/IVS.2003. 1212901 (Year: 2003).*

Tee et al., Survey of position based routing for Inter Vehicle Communication system, Oct. 22, 2008, 2008 First International Conference on Distributed Framework and Applications, DOI= https://doi.org/10.1109/ICDFMA.2008.4784433 (Year: 2008).*

Xian et al., An enhanced greedy perimeter stateless routing algorithm for wireless sensor network, May 29, 2016, 2016 IEEE International Conference of Online Analysis and Computing Science (ICOACS), DOI=https://doi.org/10.1109/ICOACS.2016. 7563075 (Year: 2016).*

Brad Karp et al., "GPSR: Greedy Perimeter Stateless Routing for Wireless Networks", Proceedings of the Sixth Annual ACM/IEEE International Conference on Mobile Computing and Networking, Aug. 1, 2000, pp. 243-254.

May 30, 2018 Office Action issued in U.S. Appl. No. 15/426,190.

Salhi, Ismail et al., "Data Collection in Vehicular Networks". 2007.

Nov. 21, 2018 Office Action issued in U.S. Appl. No. 15/426,190.

* cited by examiner

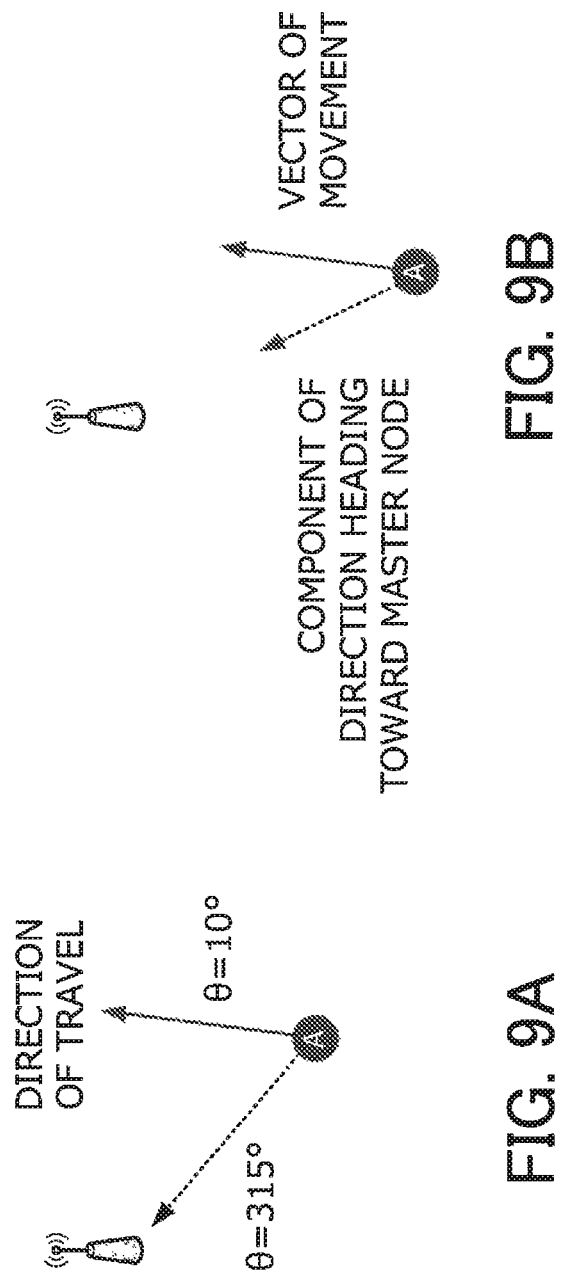

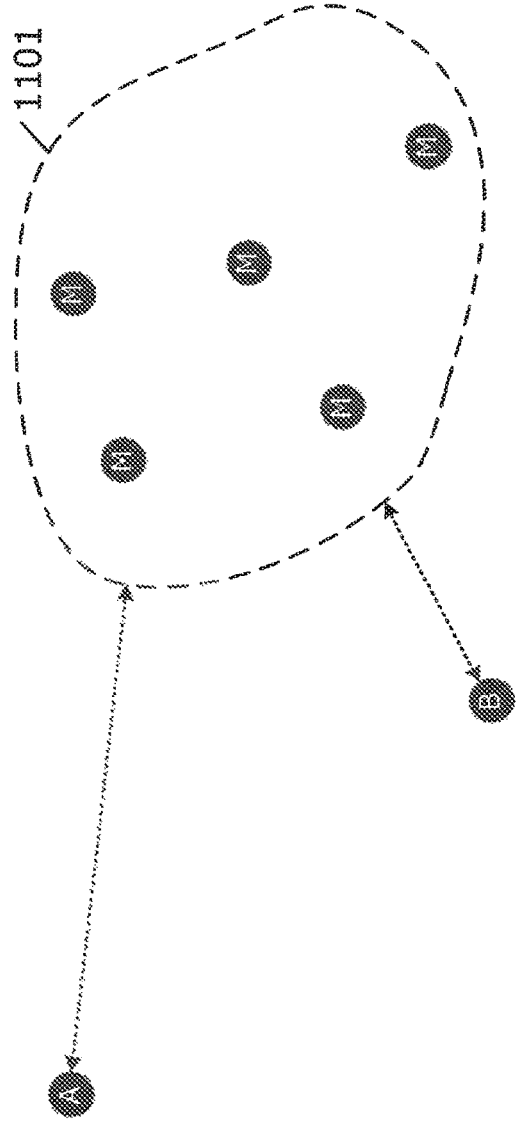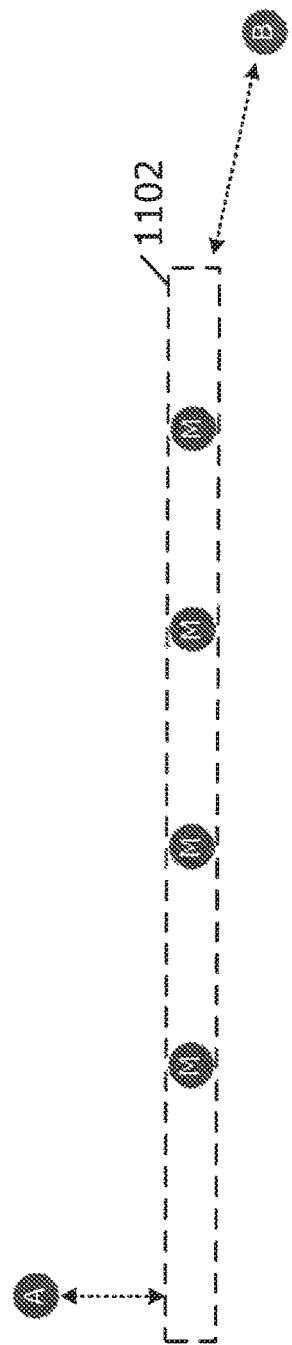

WIRELESS COMMUNICATION APPARATUS AND WIRELESS COMMUNICATION METHOD

CROSS REFERENCE TO RELATED APPLICATION

This application claims the benefit of Japanese Patent Application No. 2016-069310, filed on Mar. 30, 2016, which is hereby incorporated by reference herein in its entirety.

BACKGROUND OF THE INVENTION

Field of the Invention

The present invention relates to a wireless communication apparatus and a wireless communication method.

Description of the Related Art

Recently, the collection and use of data from traveling vehicles are being studied. For example, by collecting current positions and speed information from a plurality of vehicles, traffic congestion information can be generated in real time. In addition, smoother traffic can be facilitated by analyzing, from various angles, the data collected from the vehicles.

Inter-vehicle communication can be used to collect data from vehicles. For example, vehicles transfer data to each other using a relatively inexpensive communication apparatus such as a wireless LAN, and a vehicle capable of connecting to a wide area network such as the Internet uploads the pieces of data on behalf of the other vehicles.

Forming such a network not only enables data generated by each vehicle to be transmitted to the wide area network but also enables information transmitted from the wide area network to be shared among a plurality of vehicles (Japanese Patent Application Laid-open No. 2014-096630).

SUMMARY OF THE INVENTION

According to the system described in Japanese Patent Application Laid-open No. 2014-096630, data collected by each vehicle can be communicated to an access point by having communication apparatuses respectively mounted on vehicles relay information.

However, the system described above does not take into consideration points such as to which vehicle information is to be transferred next by a vehicle-mounted communication apparatus transmitting information in order to collect information in a more efficient manner. In other words, there is room for improvement in the information communication efficiency.

Moreover, it may seem that a communication route of information can be generated by performing dynamic routing. However, in a network in which a traveling vehicle constitutes a node, since a position of the node constantly changes, a validity period of routing information is extremely short. In other words, performing routing by having nodes exchange route information is unrealistic.

The present invention has been made in consideration of the problems described above and an object thereof is to improve the information communication efficiency in a system which collects information using a plurality of wireless communication apparatuses.

The wireless communication apparatus according to the present invention is a wireless communication apparatus which transfers information addressed to the master node.

The present invention can be applied to a network which gathers information to the master node. In the present specification, a side that is logically close to the master node will be referred to as an upstream side and an opposite side thereof will be referred to as a downstream side. Specifically, a relay of information is performed from a wireless communication apparatus positioned on the downstream side to a wireless communication apparatus positioned on the upstream side.

The present invention in its one aspect provides a wireless communication apparatus which transfers information addressed to a master node, the wireless communication apparatus comprising an assessment value generation unit configured to generate an assessment value representing logical proximity to the master node; an assessment value transmission and reception unit configured to transmit the generated assessment value to one or more other wireless communication apparatuses and receive assessment values from the one or more other wireless communication apparatuses by wireless communication; and a communication unit configured to when this wireless communication apparatus is a wireless communication apparatus that is logically closest to the master node among wireless communication apparatuses within a communication-enabled range, receive information addressed to the master node from other wireless communication apparatuses, and when a wireless communication apparatus that is logically closest to the master node other than this wireless communication apparatus is present among the wireless communication apparatuses within the communication-enabled range, transmit information addressed to the master node to the logically closest wireless communication apparatus, wherein the communication unit is configured to generate a delay time based on the assessment value when transferring the information received from the other wireless communication apparatuses to yet another wireless communication apparatus.

Since data flows in one direction with reference to the master node in the network that is an application object of the present invention, a wireless communication apparatus which relays information must transmit information in a direction approaching the master node. In consideration thereof, the wireless communication apparatus according to the present invention calculates an assessment value based on a logical proximity to the master node and switches between transmission and reception operations based on the assessment value.

Being logically close to a master node means that a larger amount of data can be transmitted to and received from the master node in a shorter period of time. For example, while a larger assessment value is calculated in the following cases, assessment value calculation criteria are not limited thereto.

When a distance to the master node is small

When a standby period until communication is enabled with the master node is short When duration of communication with the master node is long When there is a large amount of data that can be transmitted to or received from the master node When the number of hops to the master node is small For example, in order to deliver information collected by a plurality of wireless communication apparatuses to a master node positioned in a given area, a wireless communication apparatus near the area may be given a higher assessment value than a wireless communication apparatus at a distant position from the area.

When entering a communication range of another wireless communication apparatus, the wireless communication apparatus according to the present invention transmits an assessment value thereof and receives an assessment value from the other wireless communication apparatus (hereinafter, the other apparatus). In other words, assessment values are exchanged between wireless communication apparatuses within a communication range. In addition, based on the exchanged assessment values, the wireless communication apparatus determines whether or not the wireless communication apparatus itself is positioned on a most upstream side of the master node among the one or more other apparatuses. Subsequently, based on a determination result, the wireless communication apparatus determines whether to transmit information to the other apparatus or receive information from the other apparatus.

According to the configuration described above, a tree structure can be formed in which information flows from the downstream side to the upstream side. In other words, in a network formed by a plurality of wireless communication apparatuses, flow of information can be appropriately controlled.

When information transmitted from a plurality of wireless communication apparatuses is collected in one place, phenomena such as an increase in pieces of overlapping information being transmitted and an increase in the number of communications being performed occur towards an upstream side, resulting in poorer transmission efficiency.

In consideration thereof, a wireless communication apparatus according to the present invention generates, when transmitting (i.e., transferring) information received from another wireless communication apparatus to yet another wireless communication apparatus, a delay time based on an assessment value, and transmits the information after the delay time elapses.

According to this configuration, for example, the number of transmissions can be reduced by bundling information to be transmitted, an amount of information can be reduced by integrating or deleting overlapping information, and the like. As a result, transmission efficiency can be improved.

In addition, since each wireless communication apparatus performs transmission and reception of information based solely on assessment values, route information or a routing table for communicating information need not be generated and exchanged. When attempting to use dynamic routing to communicate information, not only must nodes periodically exchange route information and continuously update routing information, there is also a risk that a movement of a node may disable a generated route and interrupt communication. However, in the present invention, since a communication route can be generated by a simple exchange of assessment values by wireless communication apparatuses that are close to each other, highly efficient and highly reliable communication can be performed.

Also, the wireless communication apparatus may further comprise an information generation unit configured to generate information to be transmitted to the master node.

Also, when information to be transmitted to the other wireless communication apparatuses has increased during the delay time, the communication unit may integrate two or more pieces of information which are transmission objects.

According to this configuration, the amount of information to be transmitted and the number of transmissions can be reduced and, consequently, transmission efficiency can be improved.

Also, the delay time may be longer when the assessment value is high as compared to when the assessment value is low.

The problem described above occurs more often on the upstream side than the downstream side. In consideration thereof, by setting a longer delay time for a higher assessment value, transmission efficiency can be further improved.

Also, when this wireless communication apparatus is a wireless communication apparatus that is logically closest to the master node among the wireless communication apparatuses within the communication-enabled range, the communication unit may issue a connection request to the other wireless communication apparatuses, and when a wireless communication apparatus that is logically closest to the master node is present other than this wireless communication apparatus among the wireless communication apparatuses within the communication-enabled range, the communication unit may receive a connection request from the logically closest wireless communication apparatus.

A trigger for collecting information is issued from a master node. A trigger refers to, for example, a request to collect information. Specifically, a wireless communication apparatus positioned on a most upstream side in a given range must distribute a trigger issued from the master node to wireless communication apparatuses positioned on the downstream side. In consideration thereof, the wireless communication apparatus according to the present invention issues a connection request to other wireless communication apparatuses in a given range when an assessment value of the wireless communication apparatus is the highest in the range, and receives a connection request from another wireless communication apparatus when the assessment value is not the highest. According to this configuration, a connection with a wireless communication apparatus positioned on the downstream side can be established and a connection relationship for efficiently communicating information can be established.

Also, the assessment value may be increased as a time until information transmitted from this wireless communication apparatus reaches the master node decreases.

In this manner, the wireless communication apparatus can appropriately determine the position thereof in a tree structure by calculating the assessment value based on the communication time of information between the master node and this wireless communication apparatus.

Also, the wireless communication apparatus may further comprise a positional information acquisition unit configured to acquire a current position, and the assessment value may be determined based on a frequency of communication opportunities between this wireless communication apparatus and the master node, or on a time until the communication opportunity arrives, the frequency and the time being calculated based on the current position.

A node with more opportunities to directly communicate with the master node can be determined as a node positioned on the upstream side. The frequency of communication opportunities or the time until a communication opportunity arrives may be determined based on past information or determined based on a prediction. For example, when a travel route or a destination of a wireless communication apparatus can be acquired, the communication opportunity with the master node can be determined based on these pieces of information. Alternatively, a distance to the master node or a movement direction of the wireless communication apparatus can be used.

Also, the assessment value may be larger when the time until the communication opportunity between this wireless communication apparatus and the master node arrives is short as compared to when the time is long.

The time until the communication opportunity arrives being short means that this wireless communication apparatus should be positioned more to the upstream side in the tree structure. Therefore, the assessment value may be calculated such that the shorter the time, the larger the assessment value.

Also, the assessment value may be larger when the time until the communication opportunity between this wireless communication apparatus and the master node arrives is predicted to subsequently become shorter as compared to when the time is predicted to subsequently become longer.

The time until the communication opportunity arrives subsequently becoming shorter means that this wireless communication apparatus is traveling more to the upstream side in the tree structure. Therefore, when the time is changing in a direction in which the time becomes shorter, the assessment value may be increased (in other words, a determination that the wireless communication apparatus is on the upstream side may be made).

Also, the assessment value generation unit may calculate the assessment value using respectively different criteria in accordance with a type of information to be transferred, and when information of a plurality of types is to be transferred, the communication unit uses an assessment value corresponding to the type of the information, for each type of information to be transferred.

Favorably, assessment value calculation criteria are not uniform and different criteria are used in accordance with properties of information to be communicated. Moreover, when the assessment value changes, relationships with surrounding wireless communication apparatuses also change. Therefore, the position of the wireless communication apparatus may be determined and relationships with surrounding wireless communication apparatuses may be re-generated for each type of information to be communicated.

Moreover, the present invention can be identified as a wireless communication apparatus including at least a part of the units described above. In addition, the present invention can also be identified as a wireless communication method carried out by the wireless communication apparatus. The processes and units described above may be implemented in any combination insofar as technical contradictions do not occur.

According to the present invention, the information communication efficiency can be improved in a system which collects information using a plurality of wireless communication apparatuses.

BRIEF DESCRIPTION OF THE DRAWINGS

FIGS. 9A and 9B show an example of calculating an assessment value based on a movement direction; and FIGS. 10A and 10B are diagrams showing examples of an area according to a second embodiment.

DESCRIPTION OF THE EMBODIMENTS

First Embodiment

<Outline of System>

Hereinafter, preferred embodiments of the present invention will be described with reference to the drawings.

The present invention can be applied to a system which transmits information (collects information) transmitted from a plurality of wireless communication apparatuses to a master node.

Figure 1:
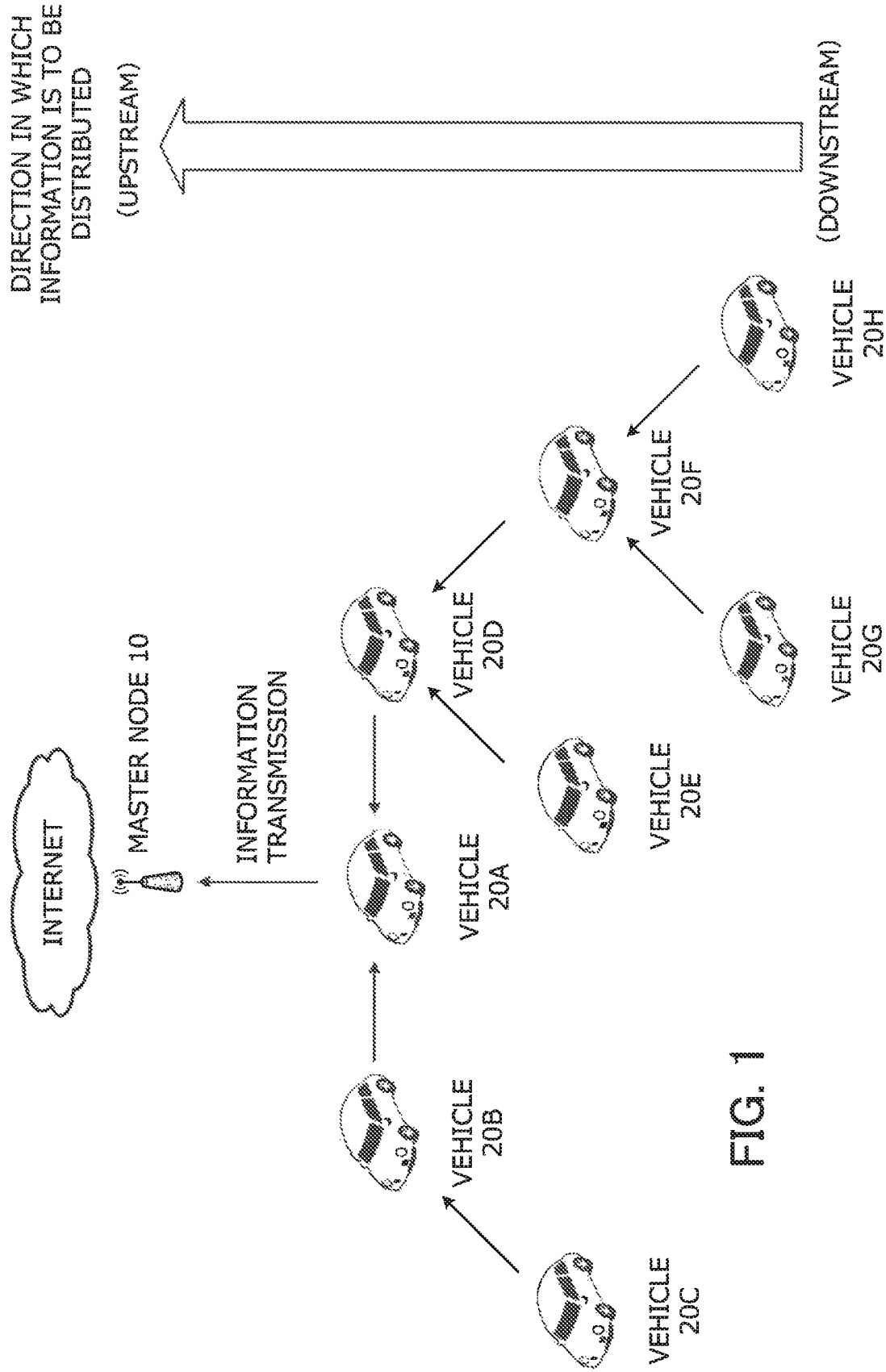
FIG. 1 is a schematic diagram showing an information transmission route according to a first embodiment.

A wireless communication system according to the first embodiment is a system which transmits information generated by a plurality of wireless communication apparatuses mounted on vehicles to a master node by having the plurality of wireless communication apparatuses communicate with each other. FIG. 1 is a schematic diagram showing an information transmission route. The wireless communication system according to the present embodiment is constituted by a master node 10 and wireless communication apparatuses mounted on a plurality of vehicles 20A to 20H (when distinctions need not be made, collectively referred to as a vehicle 20). A wireless communication apparatus 100 is an apparatus which performs wireless communication with the master node 10 and other wireless communication apparatuses 100. In addition, the master node 10 is a communication node connected to a wide area network such as the Internet. While the master node 10 is a communication apparatus fixed to the roadside in the present embodiment, alternatively, the master node 10 may be a mobile communication apparatus.

In the first embodiment, the wireless communication apparatus 100 mounted on the vehicle 20 relays information (for example, sensor data) generated in each vehicle to transmit the information to the master node 10.

When information is collected by having the wireless communication apparatuses 100 mounted on the vehicles 20 relay information to each other, to which wireless communication apparatus information is relayed (in other words, selection of a wireless communication apparatus to be a next hop destination) is important. For example, when desiring to collect information to a roadside apparatus installed at a given intersection, information should be transferred in a direction approaching the intersection rather than transferring the information in a direction away from the intersection.

When simply disseminating information, data may be unconditionally transmitted and received when a plurality of wireless communication apparatuses enter each other's communication range (so-called flooding). However, with such a method, inconveniences may occur such as information failing to reach an area to which the information is to be transmitted.

In consideration thereof, in the wireless communication system according to the present embodiment, communication control is performed such that a direction in which information is to be distributed is defined and each wireless communication apparatus 100 constituting a network distributes information from a downstream side to an upstream side. In the present embodiment, a side that is logically far from the master node (in other words, a side where information to be collected is generated) will be referred to as downstream and a side that is logically close to a master node (in other words, a side where information to be collected reaches in a delayed manner) will be referred to as upstream.

Upstream and downstream are not necessarily related to actual distances from the master node. For example, in order to transmit information from an entire area toward a given point A, a hierarchical relationship may be configured such that the point A is most upstream. When entering a state where communication can be performed with another wireless communication apparatus, a wireless communication apparatus according to the present embodiment characteristically determines which wireless communication apparatus is to be positioned upstream (downstream) and determines a transmission/reception destination of information based on a result of the determination.

Examples of information to be transmitted to the master node include, but are not limited to, sensor data acquired by a sensor mounted to a vehicle.

<System Configuration>

Figure 2:
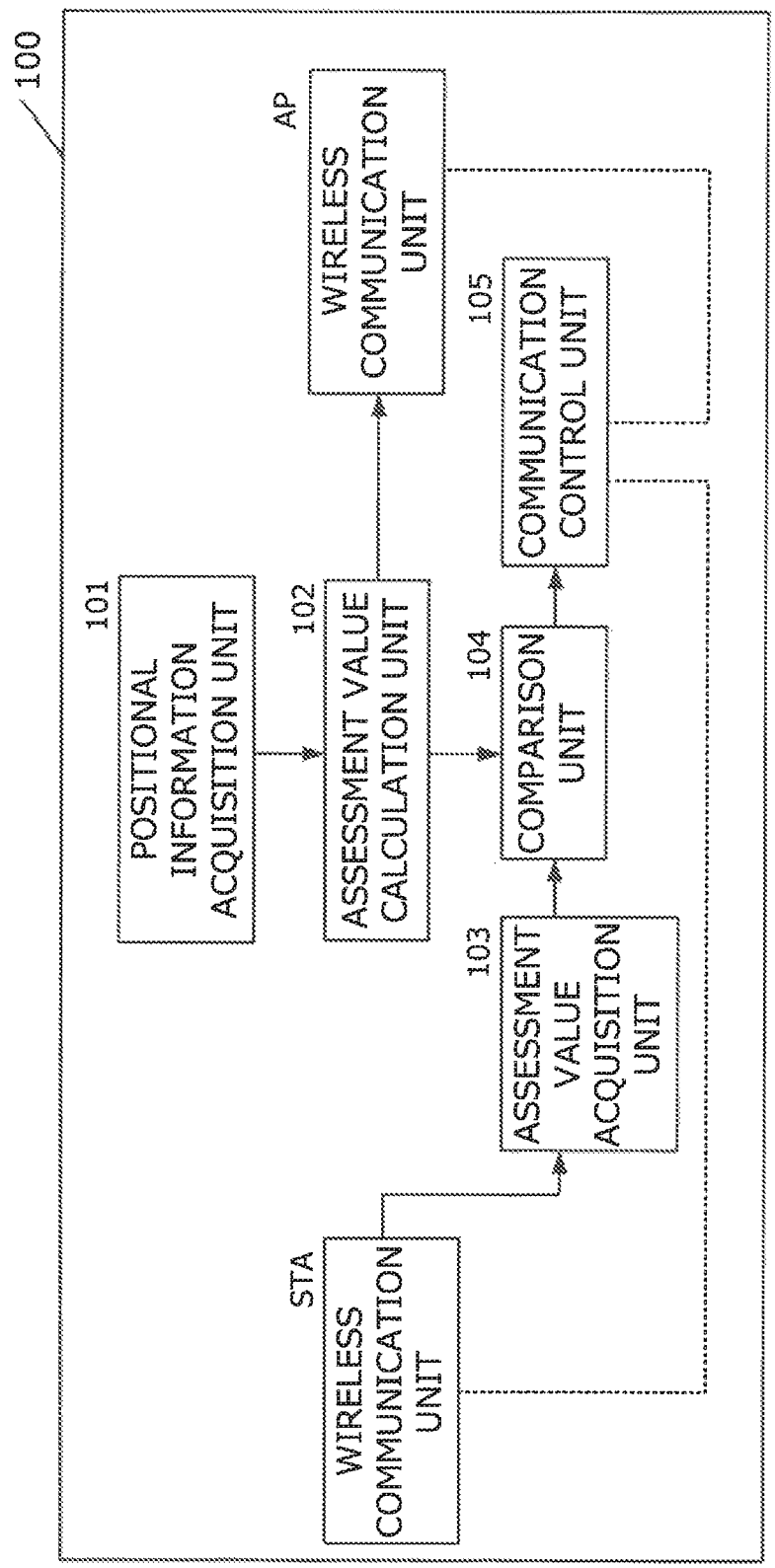
FIG. 2 is a configuration diagram of a wireless communication apparatus 100 according to the first embodiment.

A configuration of the wireless communication apparatus 100 according to the first embodiment will be described with reference to FIG. 2.

The wireless communication apparatus 100 is a communication apparatus to be mounted on the vehicle 20 and includes a wireless communication unit STA, a positional information acquisition unit 101, an assessment value calculation unit 102, an assessment value acquisition unit 103, a comparison unit 104, a communication control unit 105, and a wireless communication unit AP.

The wireless communication apparatus 100 can be configured as an information processing apparatus including a CPU (an arithmetic processing apparatus), a main storage apparatus, and an auxiliary storage apparatus. The respective units illustrated in FIG. 2 function as a program stored in the auxiliary storage apparatus is loaded to the main storage apparatus and executed by the CPU. Alternatively, all of or a part of the illustrated functions may be executed using exclusively designed circuits.

The positional information acquisition unit 101 is a unit which acquires a current position (latitude and longitude) of the wireless communication apparatus 100 from a GPS module (not shown) provided on the apparatus.

The wireless communication units STA and AP are units which include a wireless communication interface and which transmit and receive information by wireless communication. In the present embodiment, the wireless communication units STA and AP perform communication conforming to a wireless LAN (IEEE 802.11) communication system (infrastructure mode).

Specifically, the wireless communication unit STA is a unit which, as a wireless LAN client, transmits and receives information to and from wireless LAN access points such as the master node 10 and the wireless communication unit AP included in other wireless communication apparatuses 100. In addition, the wireless communication unit AP is a unit which, as a wireless LAN access point, transmits and receives information to and from the wireless communication unit STA included in other wireless communication apparatuses 100.

The communication control unit 105 is a unit which controls transfer of information using the wireless communication units STA and AP. Specifically, information generated at each vehicle is received from a wireless communication apparatus positioned on the downstream side (a side far from the master node 10) and transferred to a wireless communication apparatus (or the master node itself) positioned on the upstream side (a side close to the master node 10). How the wireless communication units STA and AP are used during transfer will be described later.

Contents of processes performed by the other functional blocks will be described later with reference to flow charts.

The master node 10 is a roadside apparatus which collects information from the vehicle 20. Using collected information, the master node 10 generates, for example, traffic information and information which contributes to traffic safety. In addition to collecting information, the master node 10 has a function of broadcasting an assessment value (to be described later).

<Outline of Processes>

An outline of processes performed by the wireless communication apparatus according to the first embodiment will now be presented.

The wireless communication apparatus according to the present embodiment enables assessment values to be exchanged between wireless communication apparatuses which are positioned within each other's communication range by periodically calculating an assessment value and broadcasting the calculated assessment value. An assessment value is a value representing a logical proximity to the master node 10 among a plurality of wireless communication apparatuses. A high assessment value means that transmitted information reaches the master node 10 in a shorter period of time.

The wireless communication apparatus according to the present embodiment retains criteria (hereinafter, assessment value calculation criteria) for calculating an assessment value in accordance with properties of information to be collected in the assessment value calculation unit 102. While the assessment value calculation criteria can be defined by, for example, a mathematical expression, the assessment value calculation criteria can also be defined by other means.

For example, the assessment value calculation criteria may be set upon shipment from a factory or may be acquired via a public communication network (for example, a cellular communication network or a public wireless LAN) or broadcast waves.

In addition, assessment value calculation criteria include positional information of a master node.

Figure 3:
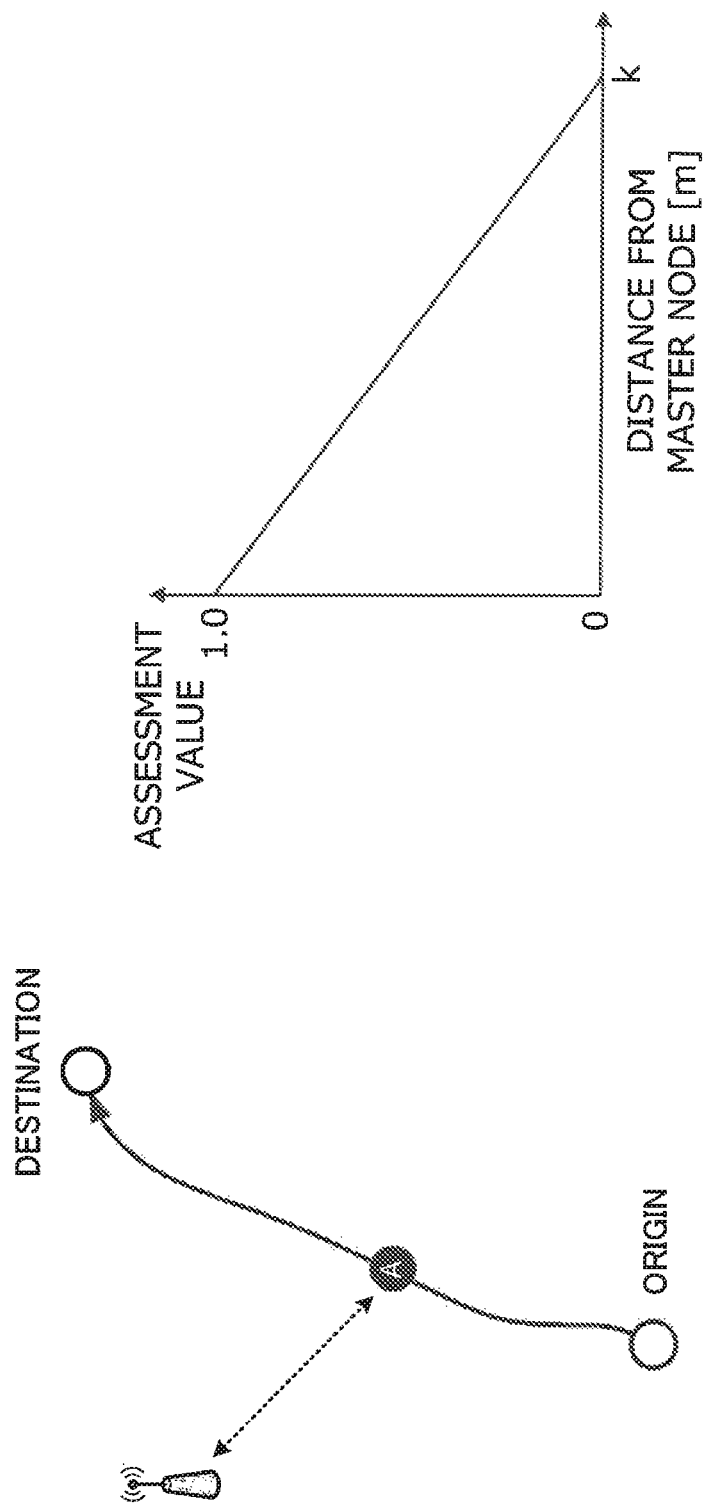
FIGS. 3A and 3B show an example of assessment value calculation criteria according to the first embodiment.

For example, assessment value calculation criteria is used such that, when properties of information that is a collection object are "ultimately transmitted to a master node positioned at point X", "the closer to the point X, the higher the assessment value, and the further away from the point X, the lower the assessment value". FIG. 3A is a diagram representing a distance between a moving wireless communication apparatus A and a master node.

In addition, FIG. 3B shows an example of assessment value calculation criteria which simply determine an assessment value in accordance with a distance from the master node. In this case, the assessment value of the master node itself is 1.0. In addition, the assessment value at a point separated from the master node by k[m] is 0. In the example shown in FIGS. 3A and 3B, since an assessment value is simply determined in accordance with the distance from the master node, the physically closer to the master node, the higher the assessment value.

Moreover, the example shown in FIGS. 3A and 3B is merely exemplary and any criteria may be used to calculate an assessment value. For example, when desiring to have information generated in a vicinity of a point Y delivered to the master node, assessment values may be calculated such that, the closer to point X, the higher the assessment value, and the closer to point Y, the lower the assessment value.

In addition, when desiring to have information collected from a vehicle on a road that leads to a given intersection, an assessment value may be determined in accordance with both a distance from the intersection and a distance from the road.

Next, a method in which the wireless communication apparatus 100 having assessment value calculation criteria communicates information will be described with reference to FIG. 4 which is a flow chart showing processes performed by the wireless communication apparatus 100 and to FIG. 5 which is a diagram representing positions of the master node 10 and vehicles mounted with the wireless communication apparatus 100. In this case, it is assumed that only one type of assessment value calculation criteria shown in FIG. 3B are to be used.

Figure 4:
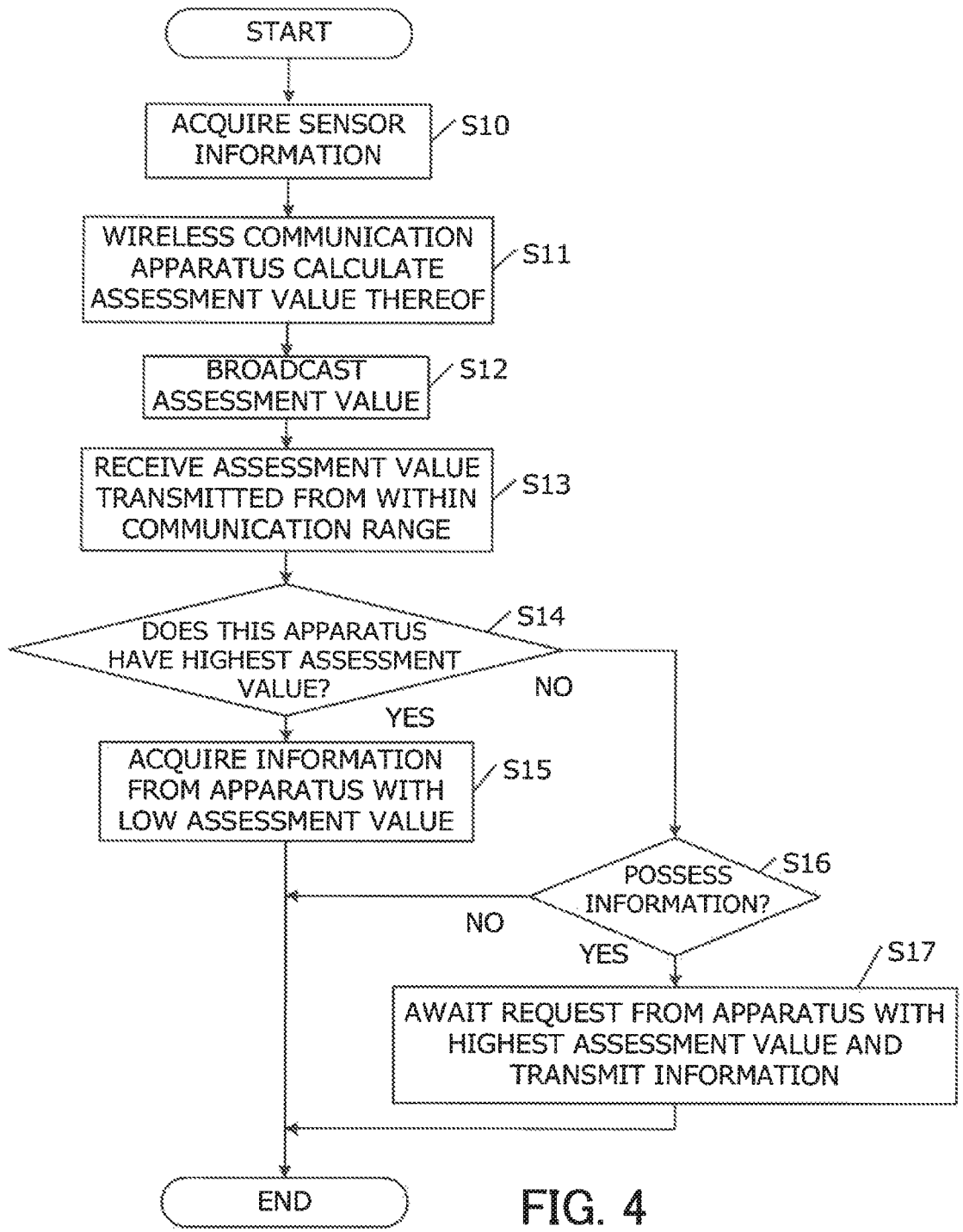
FIG. 4 is a flow chart of a process performed by the wireless communication apparatus 100 according to the first embodiment.

The processes shown in FIG. 4 are periodically executed.

Figure 5:
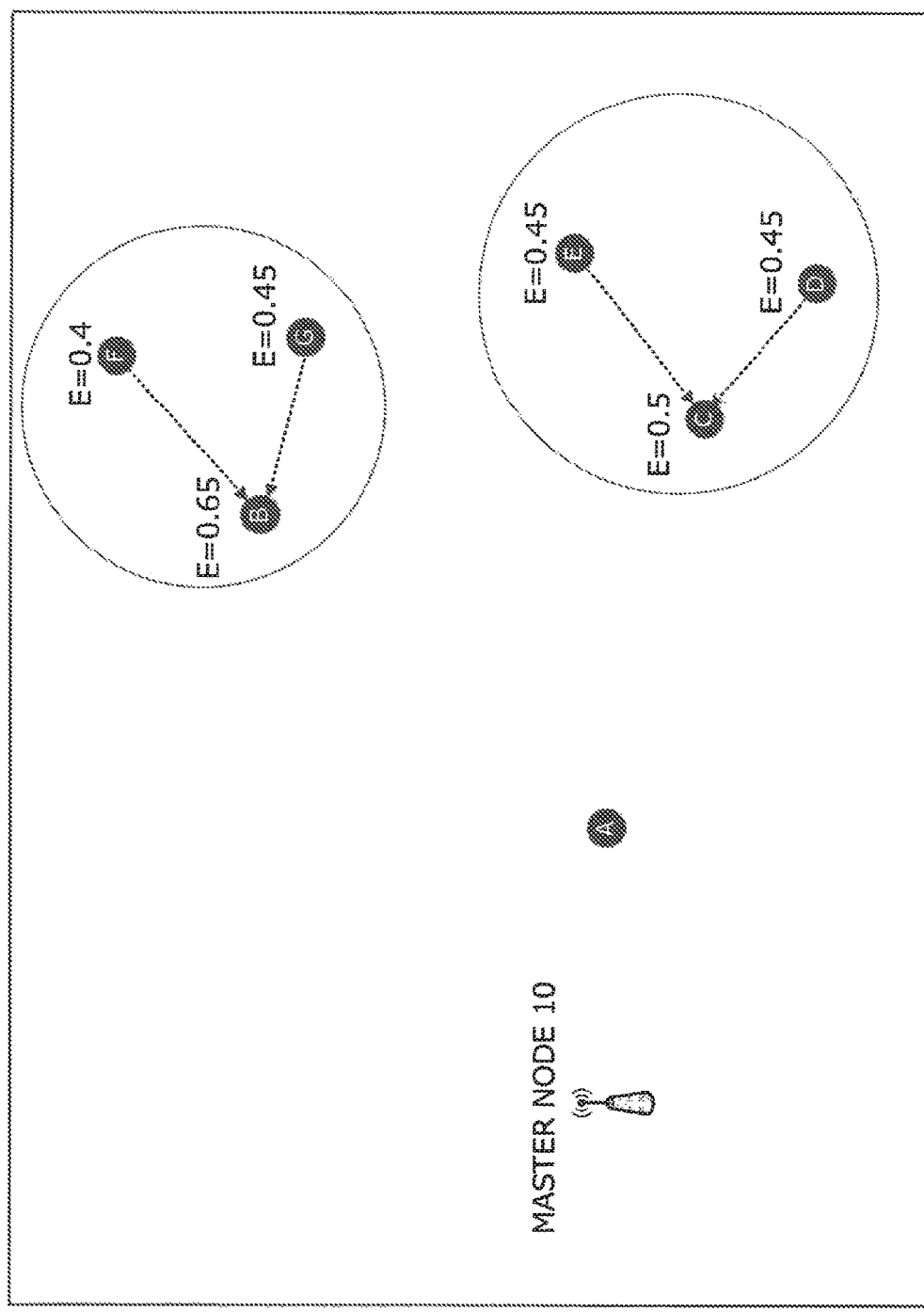
FIG. 5 is a diagram representing a positional relationship between a master node 10 and the wireless communication apparatus 100.

Moreover, in FIG. 5, a circular dotted line represents a set of wireless communication apparatuses that are respectively within a communication range, and A to G are reference characters corresponding to the wireless communication apparatuses 100. Hereinafter, the wireless communication apparatuses A to G may also be simply referred to as apparatuses A to G.

First, in step S10, the wireless communication apparatus acquires information (information to be ultimately transmitted to the master node) from a sensor (not shown) provided in a vehicle. The acquired information is temporarily stored in a memory (not shown).

Next, in step S11, the positional information acquisition unit 101 acquires a current position of the apparatus and transmits the current position to the assessment value calculation unit 102. The assessment value calculation unit 102 then calculates an assessment value using a position of the master node, the current position of the apparatus, and the assessment value calculation criteria. The calculated assessment value is transmitted to the wireless communication unit AP and the comparison unit 104.

Next, in step S12, the wireless communication unit AP broadcasts the assessment value calculated by the assessment value calculation unit 102. Transmission of the assessment value may be performed using, for example, a wireless LAN beacon. For example, the calculated assessment value may be included in an ESSID.

Next, in step S13, the assessment value acquisition unit 103 receives an assessment value transmitted from another apparatus via the wireless communication unit STA. Moreover, steps S12 and S13 need not necessarily be executed in the illustrated order. For example, both steps may be executed in parallel and an advance may be made to a next step once transmission and reception are completed. The assessment value received from the other apparatus is transmitted to the comparison unit 104.

In this case, as shown in FIG. 5, it is assumed that the apparatuses B, F, and G have respectively calculated assessment values (E) of 0.65, 0.4, and 0.45 in accordance with distances from the master node 10. In addition, it is assumed that the apparatuses C, D, and E have respectively calculated assessment values (E) of 0.5, 0.45, and 0.45 in accordance with distances from the master node 10.

The calculated assessment values are broadcast from the respective wireless communication apparatuses and shared by the other wireless communication apparatuses in the communication range.

Next, in step S14, the comparison unit 104 compares the assessment value calculated by the assessment value calculation unit 102 and the assessment value received from the other apparatus and determines whether or not the assessment value of the apparatus to which the assessment value calculation unit 102 belongs is the highest among the wireless communication apparatuses within the communication range. As a result, when a positive determination is made, it is recognized that the apparatus is positioned most upstream (hereinafter, a first position) within the communication range. In addition, when a negative determination is made, it is recognized that the apparatus is positioned on the downstream side (hereinafter, a second position).

In this case, when focusing attention on the apparatus B, since the assessment value of the apparatus B is highest among the wireless communication apparatuses within the communication range, the apparatus B recognizes that the apparatus B is positioned on the most upstream side. In addition, the apparatuses F and G recognize that the apparatuses F and G are positioned on the downstream side.

Furthermore, when focusing attention on the apparatus C, since the assessment value of the apparatus C is highest among the wireless communication apparatuses within the communication range, the apparatus C recognizes that the apparatus C is positioned on the most upstream side. In addition, the apparatuses D and E recognize that the apparatuses D and E are positioned on the downstream side.

Determination results are transmitted to the communication control unit 105.

When it is determined that the wireless communication apparatus is at the first position (in other words, at an upper position in the tree structure), the wireless communication apparatus collects information from a plurality of wireless communication apparatuses at the second position.

Information collected from the other apparatuses is temporarily stored in a memory (not shown) together with information acquired in step S10. Hereinafter, "information possessed" means that the information is stored in a memory.

In addition, when it is recognized that the wireless communication apparatus is at the second position (in other words, at a lower position in the tree structure), the wireless communication apparatus transmits information possessed by the apparatus to the wireless communication apparatus at the first position.

In the present embodiment, an apparatus at the first position performs an operation of issuing a connection request to an apparatus at the second position and collecting information after the connection is completed.

In step S15, the wireless communication unit STA is controlled so that wireless connection is established with the other apparatuses, and a transmission request for information is transmitted after the connection is established. As a result, the information possessed by the wireless communication apparatuses at the second position is transmitted to the wireless communication apparatus at the first position.

Moreover, for example, a transmission request includes, but is not limited to, an identifier of the master node, a type, an area, a period, and a collection unit of the information requested, and various restrictions (a maximum number of transfers and a cutoff time). In the present embodiment, a transmission request is assumed to include a final cutoff time (hereinafter, a final time) when transmitting information according to the transmission request.

On the other hand, in step S16, a determination is made on whether or not the information is being possessed, and if so, the wireless communication unit AP awaits a transmission request transmitted from another apparatus (a wireless communication apparatus with the highest assessment value or the master node).

In step S17, a transmission request transmitted from another apparatus is awaited and, when a transmission request is received, possessed information is transmitted. In the present embodiment, the two processes of an "information integration process" and "insertion of delay time" are performed in step S17. The processes will be described later.

According to steps S16 and S17, a transmission request for information is transmitted from the wireless communication apparatus at the first position to the wireless communication apparatuses at the second position and, in response thereto, information is transmitted from the wireless communication apparatuses at the second position to the wireless communication apparatus at the first position.

In the example shown in FIG. 5, the wireless communication unit STA of the apparatus C establishes connections with the wireless communication units AP of the apparatuses D and E and issues transmission requests to the apparatuses D and E. In response thereto, information is transmitted from the apparatuses D and E to the apparatus C. (The same applies to the apparatus B and the apparatuses F and G.)

Figure 6:
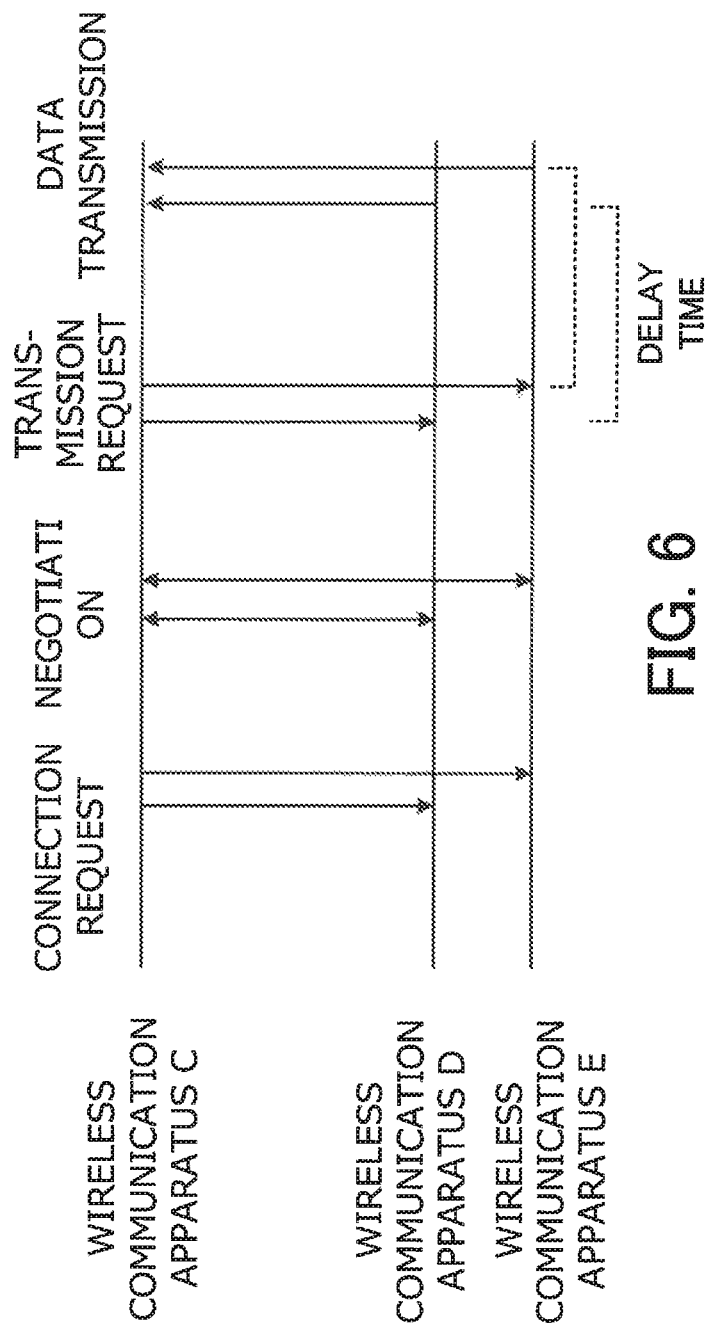
FIG. 6 is a sequence diagram showing communication between apparatuses.

FIG. 6 is a sequence diagram showing communication between apparatuses.

In this case, the apparatuses C, D, and E will be described.

First, the apparatus C respectively issues connection requests to the apparatuses D and E and negotiation is performed. At this point, the wireless communication units AP included in the apparatuses D and E operate as servers that accept the connection request. In addition, the wireless communication unit STA included in the apparatus C operates as a client that issues the connection request.

Once connections are established, the apparatus C respectively transmits transmission requests to the apparatuses D and E and, in response thereto, information is transmitted from the apparatuses D and E to the apparatus C (a description of a delay time will be given later).

Moreover, in the present example, a side with a higher assessment value is operated as a client and a side with a lower assessment value is operated as a server. This is because an apparatus on the side with the higher assessment value must issue connection requests to a plurality of apparatuses. However, when connections can be established by long polling or the like, the server and the client may be reversed.

Figure 7:
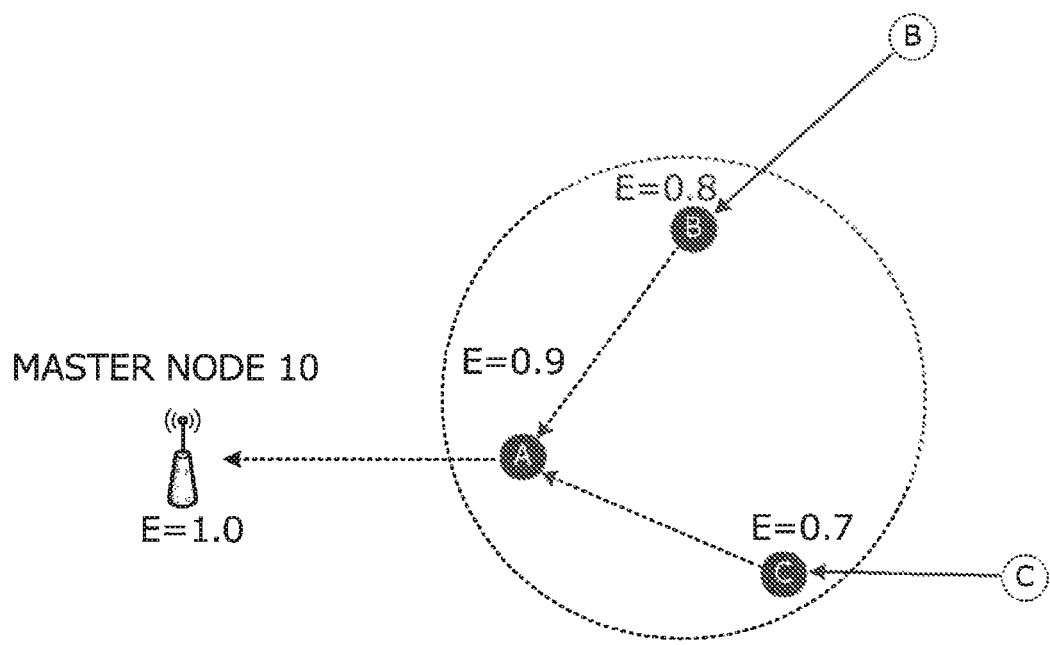
FIG. 7 is a diagram representing a positional relationship between the master node 10 and the wireless communication apparatus 100.

The process described above is periodically executed. FIG. 7 is a diagram representing positions of vehicles in a period following the process shown in FIG. 5. It is assumed that the apparatuses B and C have respectively moved from positions indicated by white circles to positions indicated by black circles. In this case, the apparatuses B and C enter a state where the apparatuses B and C can communicate with the apparatus A.

Even in this case, the same process as that described with reference to FIG. 4 is performed. In other words, each apparatus acquires an assessment value and shares the assessment value by broadcast. In the example shown in FIG. 7, an assessment value corresponding to the apparatus B rises to 0.8. On the other hand, since the assessment value of the apparatus A is even higher than that of the apparatus B, the apparatus A becomes an acquirer of information. In a similar manner, an assessment value corresponding to the apparatus C rises to 0.7. On the other hand, since the assessment value of the apparatus A is even higher than that of the apparatus C, the apparatus A becomes an acquirer of information.

By repetitively performing the process described above, information is aggregated from an apparatus with a low assessment value to an apparatus with a higher assessment value. In the present embodiment, since an assessment value is determined in accordance with a distance from the master node, information is sequentially transferred in a direction approaching the master node.

<Information Integration Process>

Next, the information integration process executed in step S17 will be described.

The wireless communication apparatus according to the present embodiment transmits both information received from a plurality of wireless communication apparatuses positioned on the downstream side and information acquired in step S10 to a wireless communication apparatus (or a master node) positioned on the upstream side. However, in such a mode, since the number of nodes decreases toward the upstream side, there is a risk that an amount of information may become excessive in comparison to a usable wireless band.

In consideration thereof, in step S17, the wireless communication apparatus according to the present embodiment performs a process of integrating information to be transmitted to the upstream side. Moreover, in the present specification, integration of information refers to a process of reducing redundant information.

Integration of information can be performed by a method such as those described below.

(1-A) Deletion of Unnecessary Information

For example, when the same (or substantially the same) information is transmitted from a plurality of wireless communication apparatuses, the information is favorably transmitted to the upstream side after deleting unnecessary information. For example, when same pieces of information are received from two or more wireless communication apparatuses, one of the pieces of information may be discarded. In this case, information describing that the received information had been transmitted from two or more wireless communication apparatuses in a same time period may be added to the information to be transferred.

(1-B) Reduction of Information Amount by Computation

For example, when the master node requires an average value of values (sensor values) indicated by sensor data collected from the respective vehicles, instead of transmitting a list of the sensor values without modification, the wireless communication apparatus at the first position computes an average value and only transfers a result of the computation. In this case, information expressing the number of values from which the average value is computed may be added.

As described above, the amount of information can be reduced by having the wireless communication apparatus to transfer information take on a part of the computation to be performed by the master node.

(1-C) Reduction of Number of Communications

Even when pieces of information are not related to each other, the number of communications can be reduced by encapsulating the pieces of information into a single piece of data and transmitting the data. For example, when information encoded by a prescribed procedure is to be transmitted, information received from a wireless communication apparatus positioned on the downstream side may be first decoded and then encoded once again after adding information acquired in step S10, and then transmitted to the upstream side. By adopting such a process, the number of communications can be reduced. The prescribed procedure may be a compression process or an encryption process of the amount of information.

The processes described above are merely examples and any other process may be performed as long as the process enables an amount of communication or the number of communications to be reduced.

<Insertion of Delay Time>

The more a wireless communication apparatus is positioned on the upstream side, the larger the amount of information received from wireless communication apparatuses positioned on the downstream side. In other words, efficiency may improve by integrating information after a certain amount of information is accumulated. In consideration thereof, in the present embodiment, instead of immediately transmitting possessed information upon receiving a transmission request in step S17, information is transmitted after standing by for a delay time determined in accordance with an assessment value. The higher the assessment value, the longer the delay time.

In addition, when the execution period shown in FIG. 4 arrives during the performance of a delay, processes are performed in parallel. Furthermore, when possessed information (information to be transmitted to the upstream side) increases as a result of executing the processes shown in FIG. 4 in parallel, the information integration process described above is performed and information is transmitted in a batch after the delay time elapses.

As described above, a wireless communication apparatus according to the present embodiment repetitively performs a process of exchanging assessment values in a range where communication is enabled and transmitting or receiving information within the range based on the assessment values. As a result, information is gradually aggregated from an apparatus with a low assessment value to an apparatus with a high assessment value. In other words, by appropriately setting assessment value calculation criteria, a transmission route of information can be controlled without having to perform dynamic routing.

In addition, when transferring information to the upstream side, processes of inserting a delay time in accordance with an assessment value and integrating information having increased during the delay time are performed. Accordingly, the amount of information to be transferred to the upstream side can be reduced.

Moreover, although not mentioned with reference to FIG. 4, a validity period may be set to information to be transmitted. For example, time information may be set to the information to be transmitted, and transfer of information of which the set time has elapsed may be stopped. Alternatively, transfer may be stopped when an elapsed time from a time of initial transmission exceeds a prescribed time.

In addition, a validity period need not necessarily be in a time format. For example, a transfer may be stopped when a distance from the master node equals or exceeds a prescribed distance or a transfer may be stopped when reaching a prescribed area. Alternatively, a transfer may be stopped when deviating from a prescribed area. In addition, a transfer may be stopped when a same wireless communication apparatus travels a prescribed distance or more while possessing same information. Alternatively, a transfer may be stopped when the number of hops exceeds a prescribed value.

Furthermore, when a final time is included in a transmission request, the wireless communication apparatus 100 favorably sets a delay time so that the time at which information is to be transmitted (or the time at which information is predicted to reach the master node) does not exceed the final time.

Modification of First Embodiment

In the first embodiment, an assessment value is determined based on a current position. Examples of a method of determining an assessment value based on positional information other than a current position will now be described.

Figure 8B:
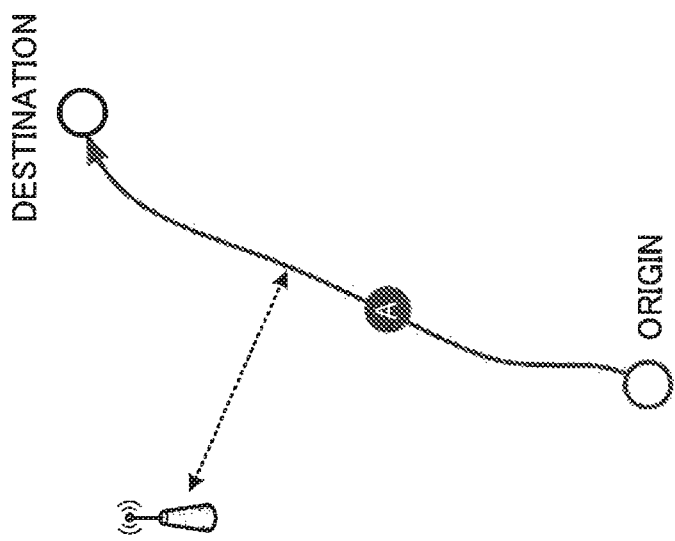
FIGS. 8A and 8B are diagrams representing a positional relationship between the master node 10 and the wireless communication apparatus 100.
Figure 8A:
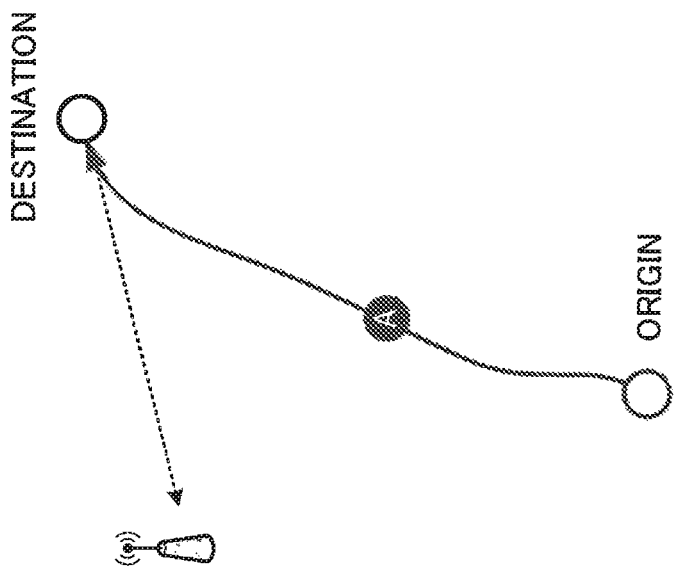

For example, when a travel route of a vehicle on which the wireless communication apparatus 100 is mounted can be acquired, an assessment value can be set such that the shorter a shortest distance (or an average distance) between a point on the travel route and the master node 10, the higher the assessment value (FIG. 8A).

In addition, the travel route need not necessarily be a route currently being traveled. For example, when past travel history of the vehicle can be acquired, a route on which the vehicle is likely to travel may be extracted from the history and an assessment value may be calculated using the extracted route.

In addition, when a destination of a vehicle on which the wireless communication apparatus 100 is mounted can be acquired, after acquiring a coordinate corresponding to the destination and a coordinate corresponding to the master node 10 and calculating a distance, an assessment value can be set such that the shorter the distance, the higher the assessment value (FIG. 8B).

Next, examples of a method of determining an assessment value based on other than positional information will be described.

A first method is a method of determining an assessment value based on the time from a moment at which a wireless communication apparatus had been last capable of communicating with a master node. When there is a record of previous communications between the wireless communication apparatus 100 and the master node 10 and the time from a moment at which communication had been last enabled is short, it is estimated that the wireless communication apparatus is present in a periphery of the master node. Therefore, an assessment value can be set such that the shorter the time, the higher the assessment value.

A second method is a method of determining an assessment value based on a length of time during which a wireless communication apparatus and a master node have previously been capable of communicating with each other. It can be predicted that the greater the length of time during which the wireless communication apparatus 100 and the master node 10 have previously been capable of communicating with each other, the higher the probability of the wireless communication apparatus 100 and the master node 10 subsequently becoming capable of communicating with each other. Therefore, an assessment value can be set such that the longer the time, the higher the assessment value. Moreover, when there are a plurality of master nodes, the time during which communication can be performed may be a sum of all times.

A third method is a method of determining an assessment value based on a movement direction of a wireless communication apparatus. It can be estimated that the closer a direction (a first angle) in which a vehicle mounted with a wireless communication apparatus is headed is to a direction (a second angle) in which the master node 10 is present as viewed from the wireless communication apparatus, the greater a subsequent reduction in the distance between the wireless communication apparatus and the master node. Therefore, an assessment value can be set such that the smaller the difference between the first angle and the second angle, the higher the assessment value (FIG. 9A).

Alternatively, a component of a direction heading toward the master node may be calculated from a vector of movement of the wireless communication apparatus, in which case an assessment value can be set such that the larger the component, the higher the assessment value (FIG. 9B).

Moreover, an assessment value may be calculated by combining the methods exemplified above.

Second Embodiment

In the first embodiment, a single roadside apparatus is adopted as the master node 10. In contrast, a second embodiment is an embodiment in which a plurality of wireless communication apparatuses present within a specific area are all considered master nodes.

FIGS. 10A and 10B are diagrams showing an example of an area according to the second embodiment. FIG. 10A represents an example where a plurality of wireless communication apparatuses M within a given region (reference numeral 1101) are all considered master nodes. In addition, FIG. 10B represents an example where wireless communication apparatuses M along a given road (reference numeral 1102) are all considered master nodes.

The wireless communication apparatus 100 according to the second embodiment differs from that of the first embodiment in that, in step S11, an assessment value is calculated based on a shortest distance to an object area.

According to this embodiment, information can be communicated efficiently when an object to which the information desirably reaches is not a specific wireless communication apparatus but a wireless communication apparatus that is present within a given area.

Moreover, while a case where an assessment value is calculated using a shortest distance to an object area has been cited in the present example, an assessment value can be calculated using other methods such as those described earlier. For example, while an example in which an assessment value is calculated based on communication opportunities with a master node has been cited in the first embodiment, in the second embodiment, an assessment value may be calculated based on communication opportunities with a wireless communication apparatus positioned within a given area. Alternatively, an assessment value may be calculated using a positional relationship between a destination or a travel route and an object area.

Third Embodiment

A third embodiment is an embodiment in which the wireless communication apparatus 100 corrects a calculated assessment value.

In the first and second embodiments, the wireless communication apparatus 100 computes an assessment value such that the logically closer to a master node, the higher the assessment value. However, there may cases where, even when a wireless communication apparatus is positioned at a location near a master node, it is inappropriate to position the wireless communication apparatus at an upper position of a tree structure depending on a state of the wireless communication apparatus (or a state of a vehicle on which the wireless communication apparatus is mounted). Examples thereof include a case where performance for transferring information is insufficient.

A third embodiment is an embodiment in which, in order to accommodate such cases, the wireless communication apparatus 100 corrects an assessment value calculated based on attributes thereof.

In the third embodiment, following step S11, a step of correcting an assessment value is executed. The correction of an assessment value is performed based on communication performance of information. For example, when free capacity of a memory included in the wireless communication apparatus 100 is small, there is a possibility that information cannot be sufficiently communicated. In consideration thereof, when low information communication performance is estimated, a correction is performed to reduce an assessment value. For example, information communication performance can be estimated according to the following items.

(1) Free Memory Capacity of Wireless Communication Apparatus

When absolute free capacity (or relative free capacity) of a memory is small, since there is a possibility that information to be transferred cannot be stored, a correction which reduces an assessment value is performed.

(2) Time from Acquisition of Information

When the time between acquisition of information to be transferred and transmission of the information to another apparatus is long, a node is determined not suitable for communicating information and a correction which reduces an assessment value is performed.

(3) Movement Distance from Acquisition of Information

When the movement distance between acquisition of information to be transferred and transmission of the information to another apparatus is long, a node is determined not suitable for communicating information and a correction which reduces an assessment value is performed.

(4) Capacity or Speed of Communication Line

When communication bit rate is low, proactive transfer is discouraged by reducing an assessment value.

In addition to the above, a correction which reduces an assessment value may be performed when there is a factor which discourages proactively transferring information.

Conversely, when there is a factor which encourages proactively transferring information, a correction which increases an assessment value may be performed. For example, when free memory capacity of a wireless communication apparatus is large or when a high-speed communication line is available, a correction which increases an assessment value may be performed.

(Other Modifications)

The embodiments described above merely represent examples and the present invention can be implemented with various modifications without departing from the spirit and scope of the invention.

For example, while a wireless communication apparatus transmits or receives an assessment value and transmits or receives information that is a communication object after determining whether the wireless communication apparatus itself is on an upstream side or a downstream side of a master node in the description of the embodiments, the information that is a communication object may be received before an assessment value or may be received at the same time as an assessment value. For example, information transmitted from another apparatus may be received and temporarily stored, and handling of the information may be determined after receiving an assessment value. Alternatively, an assessment value may be received first and a determination may be made, and whether or not a main body of information is to be received may be subsequently determined.

In addition, while one type of information is set as a communication object in the description of the embodiments, a plurality of types of information may be communicated. In this case, in accordance with the properties of the information, different assessment value calculation criteria may be provided for each type. Specifically, an assessment value may be determined based on both a state or an attribute of a wireless communication apparatus itself and properties or an attribute of the information that is a communication object. According to this configuration, an optimum route can be generated in accordance with the information to be communicated.

Moreover, when the assessment value changes, relationships with surrounding wireless communication apparatuses also change. Therefore, the processes of FIG. 4 may be repetitively executed for each type of information to be communicated. As a result, a suitable communication route can be generated in accordance with properties of information.

What is claimed is:

1. A wireless communication apparatus which transmits information addressed to a master node, the wireless communication apparatus comprising:
    a processor programmed to:
        generate an assessment value representing a logical proximity to the master node, wherein the assessment value increases as a proximity time decreases, the proximity time being a time until the information transmitted from the wireless communication apparatus reaches the master node;
        transmit the generated assessment value to one or more other wireless communication apparatuses and receive one or more assessment values from the one or more other wireless communication apparatuses by wireless communication;
        generate a delay time based on the generated assessment value, the delay time being longer when the assessment value is high as compared to when the assessment value is low; and
        after the generated delay time has elapsed and when one of the one or more other wireless communication apparatuses that is logically closest to the master node other than the wireless communication apparatus is present within a communication-enabled range, transmit the information addressed to the master node to the logically closest wireless communication apparatus.

2. The wireless communication apparatus according to claim 1, wherein the processor is programmed to generate the information addressed to the master node.

3. The wireless communication apparatus according to claim 1, wherein the processor is programmed to:
    when the information to be transmitted to the one or more other wireless communication apparatuses has increased during the delay time, integrate two or more pieces of the information which are transmission objects.

4. The wireless communication apparatus according to claim 1, wherein the processor is programmed to:
    when the one of the one or more other wireless communication apparatuses that is logically closest to the master node other than the wireless communication apparatus within the communication-enabled range, receive a connection request from the logically closest wireless communication apparatus.

5. The wireless communication apparatus according to claim 1, wherein the processor is programmed to:
    acquire a current position; and
    determine the assessment value based on (i) a frequency of a communication opportunity between the wireless communication apparatus and the master node, or (ii) a time until the communication opportunity arrives;
    wherein the frequency of the communication opportunity and the time until the communication opportunity arrives are calculated based on the current position.

6. The wireless communication apparatus according to claim 5, wherein
    the assessment value is larger when the time until the communication opportunity arrives is short as compared to when the time until the communication opportunity arrives is long.

7. The wireless communication apparatus according to claim 5, wherein
    the assessment value is larger when the time until the communication opportunity arrives is predicted to subsequently become shorter as compared to when the time until the communication opportunity arrives is predicted to subsequently become longer.

8. The wireless communication apparatus according to claim 1, wherein the processor is programmed to:
    calculate the assessment value using respectively different criteria in accordance with a type of the information to be transmitted; and
    when the information of a plurality of types is to be transmitted, use the assessment value corresponding to the type of the information, for each type of the information to be transmitted.

9. A wireless communication method in which a wireless communication apparatus which transmits information addressed to a master node executes steps of:
    generating an assessment value representing a logical proximity to the master node, wherein the assessment value increases as a proximity time decreases, the proximity time being a time until the information transmitted from the wireless communication apparatus reaches the master node;
    transmitting the generated assessment value to one or more other wireless communication apparatuses and receiving one or more assessment values from the one or more other wireless communication apparatuses by wireless communication;
    generating a delay time based on the generated assessment value, the delay time being longer when the assessment value is high as compared to when the assessment value is low; and
    after the generated delay time has elapsed and when one of the one or more other wireless communication apparatuses that is logically closest to the master node other than the wireless communication apparatus is present within a communication-enabled range, transmitting the information addressed to the master node to the logically closest wireless communication apparatus.

10. A non-transitory computer readable storing medium recording a computer program for a wireless communication apparatus which transmits information addressed to a master node, the computer program causing the wireless communication apparatus to perform:
    generating an assessment value representing a logical proximity to the master node, wherein the assessment value increases as a proximity time decreases, the proximity time being a time until the information transmitted from the wireless communication apparatus reaches the master node;

transmitting the generated assessment value to one or more other wireless communication apparatuses and receiving one or more assessment values from the one or more other wireless communication apparatuses by wireless communication;

generating a delay time based on the generated assessment value, the delay time being longer when the assessment value is high as compared to when the assessment value is low; and after the generated delay time has elapsed and when one of the one or more other wireless communication apparatuses that is logically closest to the master node other than the wireless communication apparatus is present within a communication-enabled range, transmitting the information addressed to the master node to the logically closest wireless communication apparatus.

* * * * *